US011013095B2

(12) United States Patent
Melo

(10) Patent No.: US 11,013,095 B2
(45) Date of Patent: May 18, 2021

(54) SYSTEM AND METHOD FOR TWO-LEVEL PROTECTION FOR ACCESSING CLOSED AND SEMI-CLOSED ENCLOSURES

(71) Applicant: Tarcisio Caddah Melo, Rio de Janeiro (BR)

(72) Inventor: Tarcisio Caddah Melo, Rio de Janeiro (BR)

( * ) Notice: Subject to any disclaimer, the term of this patent is extended or adjusted under 35 U.S.C. 154(b) by 33 days.

(21) Appl. No.: 15/762,042

(22) PCT Filed: Sep. 24, 2015

(86) PCT No.: PCT/BR2015/000144
§ 371 (c)(1),
(2) Date: Mar. 21, 2018

(87) PCT Pub. No.: WO2017/049370
PCT Pub. Date: Mar. 30, 2017

(65) Prior Publication Data
US 2018/0279456 A1 Sep. 27, 2018

(30) Foreign Application Priority Data

Sep. 22, 2015 (BR) .................. BR10 2015 0243758

(51) Int. Cl.
*H05C 1/00* (2006.01)
*G08B 13/26* (2006.01)
(Continued)

(52) U.S. Cl.
CPC .................. *H05C 1/00* (2013.01); *B60P 3/03* (2013.01); *E05G 1/024* (2013.01); *E05G 1/10* (2013.01);
(Continued)

(58) Field of Classification Search
CPC .. E05G 1/024; E05G 1/10; H05C 1/00; H05C 1/06; B60P 3/03; G08B 13/122; G08B 13/126; G08B 13/26; E05Y 2400/61
(Continued)

(56) References Cited

U.S. PATENT DOCUMENTS 1,374,670 A * 4/1921 Maxwell .................. E05G 7/004
109/35
1,848,625 A * 3/1932 Hager .................. A01M 1/223
43/112
(Continued)

FOREIGN PATENT DOCUMENTS

FR 2815447 * 10/2000 ............. G08B 13/22

OTHER PUBLICATIONS

International Search Report received in related International Application No. PCT/BR2015/000144 dated Feb. 19, 2016.
(Continued)

*Primary Examiner* — Suzanne L Barrett
(74) *Attorney, Agent, or Firm* — The Marbury Law Group, PLLC

(57) ABSTRACT

The system is constituted by physical and electrical barriers, with components of sensing and alarm of the first and of connection and activation of the last, all connected to the internal source constituted by set of batteries or conventional electrical system, the last one provided of batteries pack, for coverage of eventual electrical supply failures, for the length of time considered more convenient by the user. The system prevents access to closed or semi-closed enclosures, so that the detection by the sensing and alarm component of the simple approach of intrusion agent at a distance below that established activates the electrical barrier connection and activation component fed by its own sources or conventional, substitutable by the own sources in case of external
(Continued)

supply drop, making the entire energized electric barrier practically impregnable to burglary, due to the discharge of high voltage and low amperage, as appropriate.

13 Claims, 2 Drawing Sheets

(51) Int. Cl.
    *G08B 13/12*     (2006.01)
    *H05C 1/06*     (2006.01)
    *B60P 3/03*     (2006.01)
    *E05G 1/024*     (2006.01)
    *E05G 1/10*     (2006.01)

(52) U.S. Cl.
    CPC ......... *G08B 13/122* (2013.01); *G08B 13/126* (2013.01); *G08B 13/26* (2013.01); *H05C 1/06* (2013.01); *E05Y 2400/61* (2013.01)

(58) Field of Classification Search
    USPC .......................................................... 109/35
    See application file for complete search history.

(56) References Cited

U.S. PATENT DOCUMENTS

| | | | | |
|---|---|---|---|---|
| 3,182,211 A * | 5/1965 | Maratuech | ............... | H05C 1/04 307/132 E |
| 3,184,730 A * | 5/1965 | Irish | ............... | G08B 13/26 340/564 |
| 3,197,916 A * | 8/1965 | Cole, Jr. | ............... | A01M 23/38 43/66 |
| 3,594,770 A * | 7/1971 | Ham | ............... | G08B 13/126 340/550 |
| 3,696,373 A * | 10/1972 | Dunn | ............... | G08B 13/126 52/664 |
| 3,763,795 A * | 10/1973 | Wetz, Jr. | ............... | E05G 1/024 109/24 |
| 3,825,920 A * | 7/1974 | Nelson | ............... | G08B 13/04 340/550 |
| 3,851,602 A * | 12/1974 | Lamping | ............... | E05G 1/10 109/23 |
| 4,220,949 A * | 9/1980 | Pope | ............... | G08B 13/122 256/10 |
| 4,293,778 A * | 10/1981 | Williams | ............... | G08B 13/126 307/147 |
| 4,327,358 A | 4/1982 | Karas | | |
| 4,494,733 A * | 1/1985 | Olsson | ............... | A01K 3/005 256/10 |
| 4,713,725 A * | 12/1987 | Kroll | ............... | B60R 21/12 361/232 |
| 4,852,502 A * | 8/1989 | Klingberg | ............... | E05G 1/14 109/25 |
| 4,920,331 A * | 4/1990 | Ver Loren van Themaat | ............. | G08B 13/122 256/12 |
| 4,999,608 A * | 3/1991 | Galomb | ............... | G08B 13/126 340/547 |
| 5,049,854 A * | 9/1991 | Wolf | ............... | B60R 25/10 109/42 |
| 5,152,508 A * | 10/1992 | Fish | ............... | E04H 4/06 256/24 |
| 5,813,360 A * | 9/1998 | Dickey, Jr. | ............... | B60R 25/00 114/161 |
| 6,036,175 A | 3/2000 | Harper | | |
| 6,215,397 B1 * | 4/2001 | Lindskog | ............... | E05G 1/005 109/42 |
| 6,271,754 B1 | 8/2001 | Durtler | | |
| 6,341,444 B1 * | 1/2002 | Cina | ............... | A01G 13/10 43/112 |
| 6,515,587 B2 * | 2/2003 | Herbert | ............... | G08B 13/126 109/42 |
| 6,925,748 B2 | 8/2005 | McGill | | |
| 7,608,812 B2 * | 10/2009 | Beinhocker | ............... | G08B 13/126 250/227.14 |
| 7,843,338 B2 * | 11/2010 | Zhou | ............... | G08B 13/126 340/550 |
| 10,068,443 B1 * | 9/2018 | Brooks | ............... | E01F 13/00 |
| 10,070,508 B2 * | 9/2018 | Ricks | ............... | H05C 1/00 |
| 10,131,478 B2 * | 11/2018 | Maser | ............... | G07C 9/00896 |
| 10,398,138 B2 * | 9/2019 | Lampman | ............... | A01M 29/24 |
| 10,490,037 B1 * | 11/2019 | Fisher | ............... | G08B 13/22 |
| 10,800,586 B2 * | 10/2020 | Voth | ............... | B65D 55/02 |
| 2004/0046660 A1 * | 3/2004 | Ando | ............... | G08B 13/126 340/545.6 |
| 2008/0042833 A1 * | 2/2008 | Zhou | ............... | G08B 13/126 340/550 |
| 2008/0075934 A1 * | 3/2008 | Barlow, Jr. | ............... | B65D 75/00 428/199 |
| 2009/0115607 A1 * | 5/2009 | Beinhocker | ............... | G08B 13/126 340/541 |
| 2012/0187003 A1 * | 7/2012 | Stewart | ............... | B65D 5/4291 206/216 |
| 2014/0291188 A1 * | 10/2014 | Maddox | ............... | B65D 55/028 206/459.1 |
| 2016/0078730 A1 * | 3/2016 | Hasbach | ............... | B65D 79/02 340/568.1 |
| 2019/0269268 A1 * | 9/2019 | Blubaugh | ............... | A47G 29/20 |

OTHER PUBLICATIONS

International Preliminary Report received in related International Application No. PCT/BR2015/000144 dated May 12, 2015.

International Preliminary Report on Patentability received in related International Application No. PCT/BR2015/000144 dated Mar. 27, 2018.

\* cited by examiner

SYSTEM AND METHOD FOR TWO-LEVEL PROTECTION FOR ACCESSING CLOSED AND SEMI-CLOSED ENCLOSURES

INCORPORATION BY REFERENCE TO ANY PRIORITY APPLICATIONS

This application claims priority under 35 U.S.C. § 371 as a U.S. national stage filing of International Application No. PCT/BR2015/000144 filed Sep. 24, 2015, which claims the benefit of Brazilian Patent Application No. BR 10 2015 024375 8 filed Sep. 22, 2015. The PCT/BR2015/000144 application is incorporated herein by reference for all purposes.

BACKGROUND OF THE INVENTION

Field of the Invention

Instant Invention Patent Application relates to two-level protection systems for access to closed and semi-closed enclosures and a method for preventing the entry of intruders therein.

Description of the Related Art

Protection of edifices, buildings, factories, dwellings, lands, military installations, mansions and areas of general restricted access, including armored cars, truck chests, storerooms etc., has been a growing problem and difficult to master.

The use of barbed wire fences and grids has proved insufficient to contain the wave of intrusions, assaults, invasions even at Armed Forces installations, including the occurrence of weapons theft and death of people which were judged to be safe for these events.

Adding chambers, even of night vision, electrifying existing fences, coupling alarms, in addition to a panoply of other means presently available, together with enhanced surveillance of personnel has been implemented as a way to lessen the likelihood of occurrence of intrusions, with small results and always of limited scope.

The fragility in the guard of access to reserved places is acute when these chambers are made by transport trucks chests, armored cars, etc., since these vehicles are subject to passage through dangerous places, traffic jams etc., without excluding the triggering of ambushes, the deliberate placement of obstacles in the streets etc.

Also certain fixed installations are particularly targeted, such as banks, armored cars stations, barracks, weapons and ammunition storerooms etc.

Over time, fences have been used, which effective results leave much to be desired, due to their low degree of insurmountability.

The use of perimeter barriers, controlled transposition, although leading to much more effective results, is applicable only to fixed installations and implies in major works, expensive facilities and accentuated expenses.

The reduction of these occurrences requires the use of a large contingent of personnel, prepared for these eventualities, in addition to other means, thus involving the mobilization of resources and large structures, with high expenditures.

Even with the use of these devices, the violation of physical barriers no longer prevents access to the interior of the areas to be protected.

TECHNICAL PROBLEM

There is, therefore, a great need for security in general and in particular that areas of restricted access, whether in fixed installations or in vehicles, can be provided with security systems that are effective, even taking into account the violent means normally used by intruders in their attempts.

It is also desirable that these systems be operationally mounted on more than one level of security, interoperable, in order to continue to prevent intruder access in case of inactivation of first level security.

It is still a relevant need that the means involved in a possible solution to this problem are relatively economical.

It is also indispensable that the physical resources employed be discrete.

It is still an important need that the devices used to solve this problem operate continuously in any weather conditions.

It is also a significant need that the systems used can operate in the same way in diurnal and nocturnal conditions.

It is equally relevant that the systems of the invention can continue to operate in the absence of external power supply.

SUMMARY OF THE INVENTION

The invention was elaborated from the Faraday Cage concept, which explains that the energy charged in a conductive structure is distributed externally thereto.

Instant invention has been developed for the purpose of preventing unauthorized entry of intruders—including with break-in or demolition or breach by drilling of tunnels etc.—of closed-volume enclosures such as truck trunks, armored cars safes, ammunition yards, bank safes, armored cars stations, residential panic rooms etc.—or semi-closed, such as containers, transport trucks trunks, access to warehouses, bank vaults, residences etc.

Basically, the invention consists of a system of physical barriers, such as doors locked by mechanical, electronic and/or other type of locking—including with remote access activation—which, once it is attempted to be tampered with, automatically triggers the power-up of an electrically conductive network that internally or externally coats the entire closed enclosure or the part of access to the semi-closed enclosure, making them impregnable. Said network can still remain energized permanently, without energy consumption, while not violated.

BRIEF DESCRIPTION OF THE DRAWINGS

Searches carried out on the subjects involved did not detect anteriorities.

The devices of the invention are summarily represented in the attached drawings, in which.

DETAILED DESCRIPTION OF THE PREFERRED EMBODIMENT

Figure 1A:
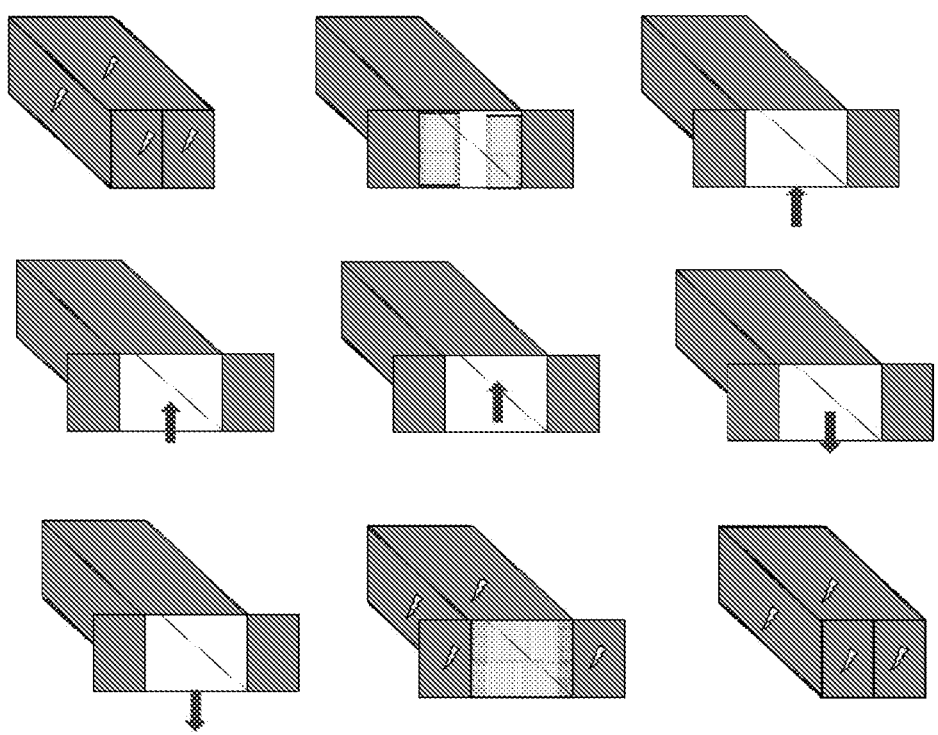
FIGS. 1A and 1B show in perspective, respectively, a container and a transport truck trunk provided with the system, including awnings or screens, for the case of a semi-closed trunk.
Figure 1B:
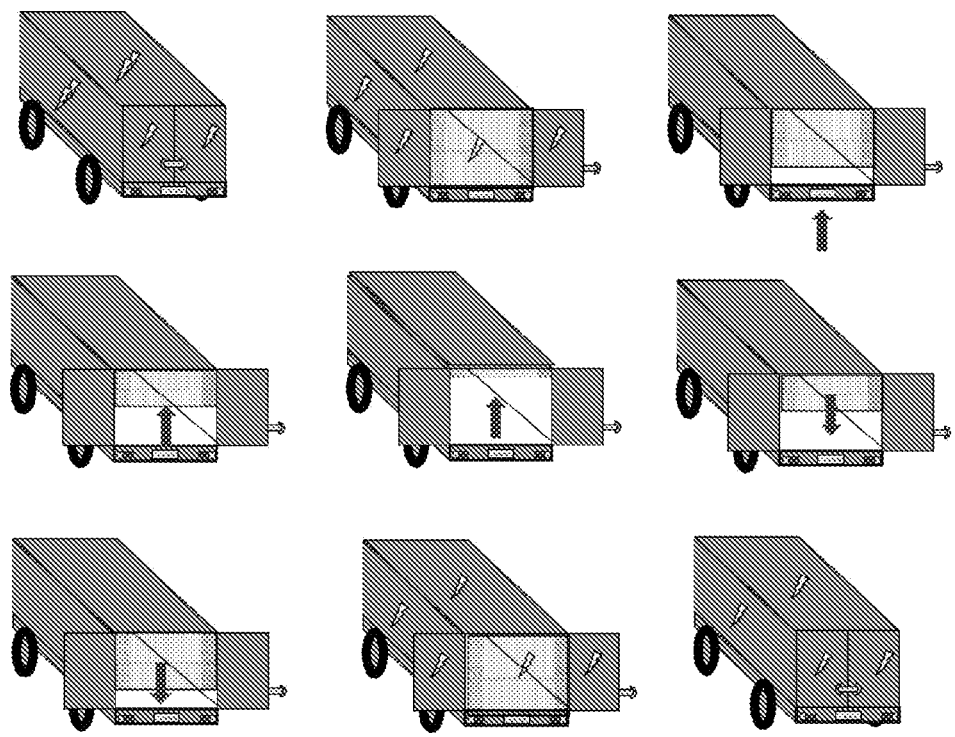
Figure 2:
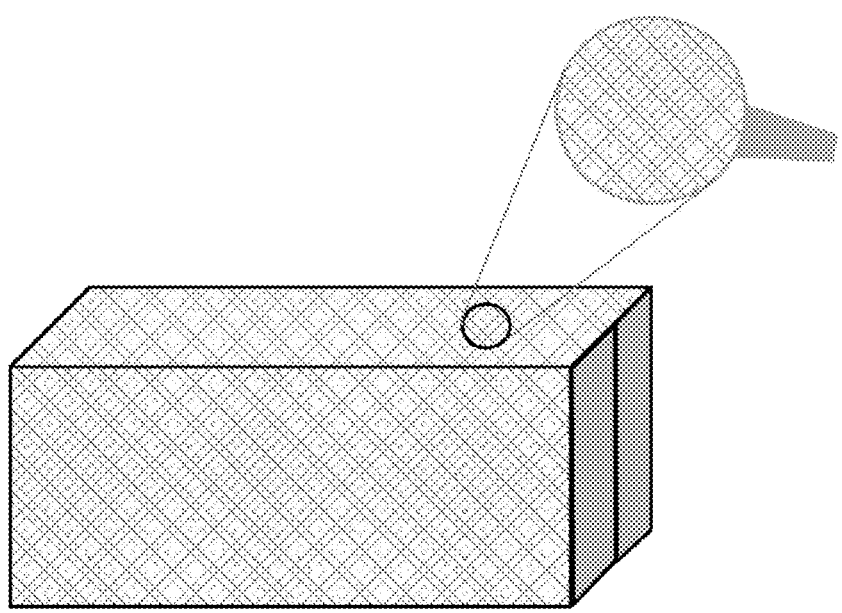
FIG. 2 shows the mesh applied to a conducting structure, used in container, truck bucket, armored car, etc. protected by the system of the invention.
Figure 3:
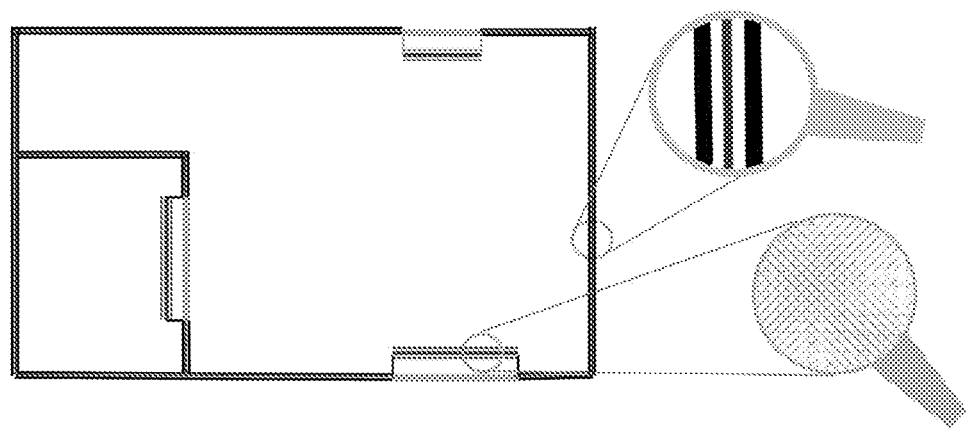
FIG. 3 corresponds to an enclosure of bank vaults, ammunitions warehouse, etc. to which instant safety systems have been applied, including the electric barrier installed between the walls of the closed enclosures on all its volumetric surface, fitted with gates and rear movable screens.
Figure 3:
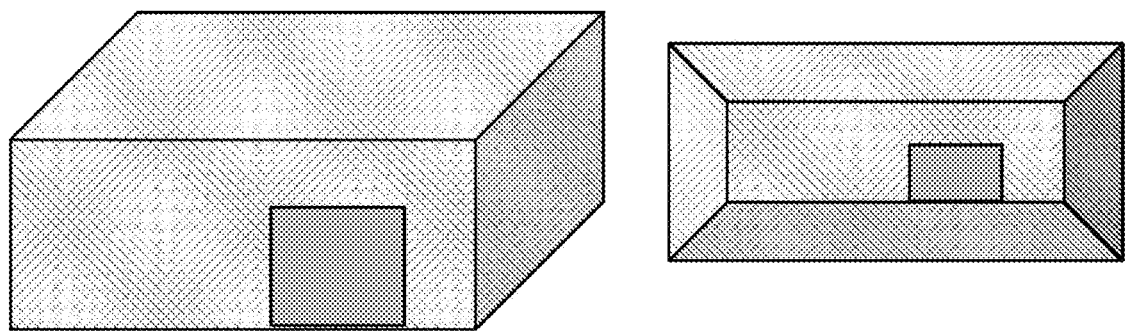

Instant invention consists of double-level safety systems, applied to semi-closed enclosures or closed (volumetrically) enclosures, to prevent unauthorized people from entering, with the protection applied respectively to some or all sides of such enclosures.

System Components

The system is composed of:
a) a physical barrier, generally formed by the sides of the truck trunk or the walls of a room of safes of a bank or warehouse of ammunitions or a panic room, including in all examples the floor and ceiling; or by the gates of a bank, mansion or barracks or core of armored cars stations etc.;
b) an electric barrier, formed by conductive structure, configured in mesh, with more or less tightening and with the most appropriate format, according to the convenience of the user, and:
  b1) insulated with insulation in the walls of the enclosure, if they are not originally conductive, as is the case of masonry constructions, trunks made of wood, etc.;
  b2) or the own sides of the closed and/or semi-closed enclosures when they are conductors, as is the case with most metal trunks of trucks;
in either case connected to awnings, internal doors or screens, which close the access to the interior of the semi-closed enclosure;
c) a connecting component between the two barriers and activation and deactivation of the energized state of the system. It is connected to an internal source consisting of a battery pack or conventional electrical system, the last provided with battery pack, to cover any electrical supply failures, for the length of time considered more convenient by the user; and
d) an alarm and sensing component of the physical barrier, formed by conventional systems of lenses and sensors of any type, for the purpose of detecting the violation or attempted violation of the physical barrier.

Definitions

In instant Invention patent Application, the following definitions are used:
a) restricted acess areas—these are semi-closed enclosures:
  (a1) represented by open truck buckets or any open spaces, covered by linings or materials of equivalent physical effect, covered by electrically conductive networks;
  a2) represented by transport trucks trunks, armored cars safes, when partly protected by the system (for example, by the sides); and
  a3) enclosures (volumetrically) closed, such as locker rooms for banks, ammunitions warehouse, sheltered cores of armored cars stations etc., when the protection is applied to all sides and to the upper and lower parts of the enclosure;
b) inactive or de-energized state—state of the system in which it is deactivated, in order to allow access to the semi-closed enclosure or closed enclosure;
c) active or energized state—state of the system in which, from the detection of violation or attempted violation of the physical barrier by the alarm and sensing component and by means of the connection and activation component, the electric barrier is put into operation, being able to emit electric shocks of high voltage and low amperage, that physically repel with violence all the contact established in any point of the electrical barrier.

System Operation

In the event of an attempted intrusion, the agent will initially attempt to violate or inactivate the physical barrier by bursting locks or latches from the enter door of the truck trunk, the door of the bank installation, of the displacement of linings or materials of equivalent physical effects of covering of buckets and/or any open spaces etc. By the alarm and sensing component, this attempt is detected and immediately triggers the entire connection and activation component, which energizes the conductive network installed in the enclosure, including the movable physical barrier. For this reason, when the agent touches any point of the access door or its latches or, for example, the normally conductive trunk sides, in the case of trunk trucks, or any point of the lining or materials of equivalent physical effects covering the bucket and/or any open space or the door of the bank or attempt to burst the walls, ceiling or floor, it will receive high voltage discharge and low amperage, which will cause its violent repulsion with possible temporary physical inactivation. Although the agent and/or his followers then attempt to burst the metal side of the trunk or to move the lining or material of equivalent physical effects of covering of the bucket and/or any open space therein, will also receive heavy discharge, due to the principle of the Faraday Cage, whereby the loads are distributed peripherally in the energized conducting structure. If the structure is non-conductive, the same shall occur when the conductive mesh is installed in isolation, in its interior, including the covering linings of the buckets or any open spaces, covered by linings or materials of equivalent physical effects.

If the enclosure is closed, that is, with protection applied on all sides, not even by the ceiling or bottom of the chest, of the room of safes etc., penetration will be possible inside. Moreover, in these situations—closed enclosures—the internal mesh can be permanently energized, not depending on sensors or any other device to activate it, in order to prevent the invasion of the enclosure by masonry breaks/attempts to excavate etc.

If the enclosure is semi-closed, in other words, with protection applied only, for example, at the rear, inside the access doors, in the case of the truck trunk, through awnings, screens or internal conductive doors, as well as displace, tear, damage the linings or materials of equivalent physical effects of covering of buckets and/or any open spaces, the inviolability will remain while the energization is maintained.

The security thus provided is, therefore, virtually integral and impregnable in the case of closed enclosures and can be applied to ammunition warehouses, rooms of safes of banks, armored cars stations, etc.

The electric barrier, once activated, will not affect the integrity of its contents, even if it is conductive, due to the Faraday Cage principle.

In the case of mansion gates, barracks etc., the system is similar to that of the semi-closed trunks, so that, behind the gates, internal screens or doors or conductive awnings are placed, integrated in the electric barrier, equally connected to the connection and activation and alarm and sensing components. As in the case of the trunk of the truck, the alarm and sensing component can be configured so that the simple approach of someone within a certain distance, to be fixed by the user of the system, causes the electric barrier to be energized, that is, to screens or internal doors or conductive awnings. The electrical barrier can, in turn, extend to the area which interests, to preserve and assume the contours considered convenient.

Various embodiments include a method of providing two-levels of protection of physical enclosures. The method may include detecting, using a sensing and alarm component, whether a physical barrier forming an enclosure is being tampered with, and energizing an electric barrier lining an interior of the physical barrier using a source of electricity disposed within the physical barrier in response to detecting the physical barrier is being tampered with, wherein the electric barrier includes a conductive mesh.

In some embodiments, once energized the electric barrier may be configured to shock an intruder in contact with the physical barrier. In addition, the method may include de-energizing the electric barrier in order to allow access to the interior of the physical barrier.

Various embodiments may include an apparatus for two-level protection of physical enclosures. The apparatus may include a physical barrier, an electric barrier, a source of electricity, and a sensing and alarm component. The physical barrier may form an enclosure. The electric barrier may be configured to line an interior of the physical barrier. The electric barrier may include a conductive mesh. The source of electricity may be coupled to the electric barrier. Also, the source of electricity may be disposed within the physical barrier. The source of electricity may be configured to selectively energize or de-energize the electric barrier. The sensing and alarm component may be configured to detect tampering of the physical barrier. The sensing and alarm component may be configured to energize the electric barrier using the source of electricity in response to detecting tampering of the physical barrier.

In some embodiments, the electric barrier may line a ceiling, a floor, and all walls of the physical barrier. Once energized, the electric barrier may be configured to shock an intruder in contact with the physical barrier. The physical barrier may include an opening providing access to an inside of the enclosure, wherein the electric barrier covers the opening. The physical barrier may include at least one door configured to cover the opening providing access to the inside of the enclosure. The sensing and alarm component may be configured to detect tampering of both the physical barrier and the at least one door. The electric barrier may be sandwiched between an inner and outer layer of the physical barrier.

In some embodiments, a secondary barrier may form an internal compartment inside the physical barrier. The physical barrier may include areas that are disposed inside the physical barrier and outside the secondary barrier. The physical barrier may be a transport vehicle, at least part of a building or fixed structure, and/or a portable structure.

What is claimed is:

1. A method of providing two-levels of protection of physical enclosures, comprising:
    detecting, using a sensing and alarm component, whether a physical barrier forming an enclosure is being tampered with, wherein the physical barrier includes a ceiling, a floor, and walls, wherein the ceiling is disposed above and opposite the floor and the walls surround an area defined by the enclosure and are disposed between the ceiling and the floor; and
    energizing an electric barrier lining an interior of the ceiling, floor, and walls using a source of electricity disposed within the physical barrier in response to the sensing and alarm component detecting that the physical barrier is being tampered with, wherein the electric barrier includes a conductive mesh.

2. The method of claim 1, wherein once energized the electric barrier is configured to shock an intruder in contact with the physical barrier.

3. The method of claim 1, further comprising:
    de-energize the electric barrier in order to allow access to the interior of the physical barrier.

4. An apparatus for providing two-level protection of physical enclosures, comprising:
    a physical barrier forming an enclosure with a ceiling, a floor, and walls, wherein the ceiling is disposed above and opposite the floor and the walls surround an area defined by the enclosure and are disposed between the ceiling and the floor;
    an electric barrier configured to line an interior of the ceiling, floor, and walls, wherein the electric barrier includes a conductive mesh;
    a source of electricity coupled to the electric barrier, wherein the source of electricity is disposed within the physical barrier and configured to energize the electric barrier; and
    a sensing and alarm component configured to detect tampering with the physical barrier, wherein the sensing and alarm component is configured to energize the electric barrier using the source of electricity in response to detecting that the physical barrier is being tampered with.

5. The apparatus of claim 4, wherein the electric barrier is configured to shock an intruder in contact with the physical barrier when the electric barrier is energized.

6. The apparatus of claim 4, wherein the physical barrier includes an opening providing access to an inside of the enclosure, wherein the electric barrier covers the opening.

7. The apparatus of claim 6, wherein the physical barrier includes at least one door configured to cover the opening providing access to the inside of the enclosure.

8. The apparatus of claim 7, wherein the sensing and alarm component is configured to detect tampering with both the physical barrier and the at least one door.

9. The apparatus of claim 4, wherein the electric barrier is sandwiched between an inner and outer layer of the physical barrier.

10. The apparatus of claim 4, further comprising:
    a secondary barrier forming an internal compartment inside the physical barrier, wherein the physical barrier includes areas that are disposed inside the physical barrier and outside the secondary barrier.

11. The apparatus of claim 4, wherein the physical barrier is configured to form part of a transport vehicle.

12. The apparatus of claim 4, wherein the physical barrier is configured to form at least part of a building or fixed structure.

13. The apparatus of claim 4, wherein the physical barrier is a portable structure.

* * * * *